US010951792B2

(12) United States Patent
Tanner et al.

(10) Patent No.: US 10,951,792 B2
(45) Date of Patent: *Mar. 16, 2021

(54) DEVICES AND METHODS FOR SELECTIVE DISPLAY FRAME FETCH (71) Applicant: Intel Corporation, Santa Clara, CA (US)

(72) Inventors: Jason Tanner, Folsom, CA (US); Paul Diefenbaugh, Portland, OR (US); Vishal Sinha, Portland, OR (US); Arthur Runyan, Folsom, CA (US); Gary K. Smith, El Dorado Hills, CA (US); Kathy Bui, Hillsboro, OR (US); Yifan Li, Beaverton, CA (US); Shirley Huang Meterelliyoz, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/726,637

(22) Filed: Dec. 24, 2019

(65) Prior Publication Data

US 2020/0137268 A1 Apr. 30, 2020

Related U.S. Application Data (63) Continuation of application No. 15/943,617, filed on Apr. 2, 2018, now Pat. No. 10,516,812.

(51) Int. Cl.
*G09G 5/399* (2006.01)
*G06T 1/60* (2006.01)
(Continued)

(52) U.S. Cl.
CPC ........ *H04N 5/0736* (2013.01); *G06F 3/1415* (2013.01); *G06T 1/60* (2013.01);
(Continued)

(58) Field of Classification Search
None
See application file for complete search history.

(56) References Cited

U.S. PATENT DOCUMENTS 5,987,179 A 11/1999 Riek et al.
7,782,940 B2 8/2010 Shah et al.
(Continued)

FOREIGN PATENT DOCUMENTS

| EP | 3190585 | 7/2017 |
|---|---|---|
| KR | 10-2012-0046119 A | 5/2012 |
| WO | 2017215035 | 12/2017 |

OTHER PUBLICATIONS

Partial European Search Report dated Jul. 31, 2019, in EP Application No. 1916648.4, filed Mar. 29, 2019; 8 pages.
(Continued)

*Primary Examiner* — Joni Hsu
(74) *Attorney, Agent, or Firm* — Hanley, Flight & Zimmerman, LLC (57) ABSTRACT Techniques for selective display frame fetching can include receiving or fetching rendered display frames by a display engine. The display engine can determine if a new frame includes one or more dirty portions. If the new frame includes one or more dirty portions, just the dirty portions can be loaded by the display engine into a display buffer. The display engine can also scan out just the dirty portions from the display buffer to a display.

27 Claims, 5 Drawing Sheets (51) Int. Cl.
*G09G 5/00* (2006.01)
*H04N 5/073* (2006.01)
*G09G 5/36* (2006.01)
*G06F 3/14* (2006.01)
*G09G 5/393* (2006.01)

(52) U.S. Cl.
CPC ............ *G09G 5/001* (2013.01); *G09G 5/363* (2013.01); *G09G 5/393* (2013.01); *G09G 5/399* (2013.01); *G09G 2310/0237* (2013.01); *G09G 2310/04* (2013.01); *G09G 2320/062* (2013.01); *G09G 2320/066* (2013.01); *G09G 2360/16* (2013.01)

(56) References Cited

U.S. PATENT DOCUMENTS

| | | | |
|---|---|---|---|
| 8,155,195 | B2 | 4/2012 | Reganathan et al. |
| 8,224,885 | B1* | 7/2012 | Doucette .............. G06F 9/5044 709/201 |
| 10,516,812 | B2 | 12/2019 | Tanner et al. |
| 2003/0107578 | A1* | 6/2003 | Willis ................ G06F 12/1027 345/545 |
| 2004/0233998 | A1 | 11/2004 | Wu et al. |
| 2009/0147853 | A1 | 6/2009 | Dane et al. |
| 2010/0118972 | A1 | 5/2010 | Zhang et al. |
| 2013/0278619 | A1* | 10/2013 | Belanger ................ G09G 5/363 345/545 |
| 2013/0328922 | A1* | 12/2013 | Belanger ................ G06T 11/00 345/629 |
| 2014/0063034 | A1 | 3/2014 | Abarca et al. |
| 2014/0086310 | A1 | 3/2014 | Tanner et al. |
| 2014/0092146 | A1* | 4/2014 | Hitaka ..................... G09G 5/10 345/690 |
| 2016/0275900 | A1* | 9/2016 | Kwa ........................ G09G 3/20 |
| 2017/0295583 | A1* | 10/2017 | Kariya ................. H04W 72/085 |
| 2018/0173060 | A1* | 6/2018 | Guo ..................... G09G 3/3611 |

OTHER PUBLICATIONS

Urban et al.; "Optimization of the Motion Estimation for Parallel Embedded Systems in the Context of New Video Standards"; SPIE Optics + Photonics; (Aug. 2012); 16 pages; San Diego, United States; <doi: 10.11117/12.939469 >.

European Patent Office, "Extended European Search Report," mailed in connection with European Patent Application No. 19166418.4, dated Oct. 29, 2019, 16 pages.

* cited by examiner

DEVICES AND METHODS FOR SELECTIVE DISPLAY FRAME FETCH

PRIORITY DATA

This application is a continuation of U.S. patent application Ser. No. 15/943,617, filed Apr. 2, 2018, now issued as U.S. Pat. No. 10,516,812, which is incorporated herein by reference.

BACKGROUND

Web browsing and productivity applications, such as word processing, spread sheet and presentation applications, are some of the most common use cases on computing devices such as desktop Personal Computer (PCs), laptop PCs, tablet PCs, smart phones and the like. There is a continuing push to lower operation for browsing, productivity applications, movie streaming and other related high-usage task to improve the user experience by increasing the Hours of Battery Life (HoBL) for such portable computing devices. Accordingly, there is a continuing need to reduce memory usage, reduce communication bandwidth utilization and reduce runtime to achieve lower power consumption in a number of different types of computing devices.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

DESCRIPTION OF EMBODIMENTS

Before technology embodiments are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to convey a thorough understanding of various technology embodiments. One skilled in the relevant art will recognize, however, that such detailed embodiments do not limit the overall inventive concepts articulated herein, but are merely representative thereof.

As used in this written description, the singular forms "a," "an" and "the" include express support for plural referents unless the context clearly dictates otherwise. Thus, for example, reference to "an" engine includes a plurality of such engines.

Reference throughout this specification to "an example" means that a particular feature, structure, or characteristic described in connection with the example is included in at least one invention embodiment. Thus, appearances of the phrases "in an example" or "in an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various invention embodiments and examples can be referred to herein along with alternatives for the various components thereof. It is understood that such embodiments, examples, and alternatives are not to be construed as de facto equivalents of one another, but are to be considered as separate and autonomous representations under the present disclosure.

Furthermore, the described features, structures, or characteristics can be combined in any suitable manner in one or more embodiments. In the following description, numerous specific details are provided, such as examples of layouts, distances, network examples, etc., to provide a thorough understanding of invention embodiments. One skilled in the relevant art will recognize, however, that the technology can be practiced without one or more of the specific details, or with other methods, components, layouts, etc. In other instances, well-known structures, materials, or operations may not be shown or described in detail to avoid obscuring aspects of the disclosure.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open-ended term in this written description, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, comparative terms such as "increased," "decreased," "better," "worse," "higher," "lower," "enhanced," "minimized," "maximized," "increased," "reduced," and the like refer to a property of a device, component, function, or activity that is measurably different from other devices, components, or activities in a surrounding or adjacent area, in a single device or in multiple comparable devices, in a group or class, in multiple groups or classes, related or similar processes or functions, or as compared to the known state of the art. For example, a data region that has an "increased" risk of corruption can refer to a region of a memory device, which is more likely to have write errors to it than other regions in the same memory device. A number of factors can cause such increased risk, including location, fabrication process, number of program pulses applied to the region, etc.

As used herein, a "flip" generally refers to an indication that it is time for a new composition to occur. For example, a "flip" can be an indication to a display controller that it should switch to a newly rendered buffer. In more general terms a "flip" can be any indication that a displayed buffer is updating. The term "flip" is generally known in video rendering and its meaning will be understood by one of ordinary skill in the art.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases, depend on the specific context. However, generally speaking, the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

The term "coupled," as used herein, is defined as directly or indirectly connected in an electrical or nonelectrical manner. "Directly coupled" items or objects are in physical contact and attached to one another. Objects or elements described herein as being "adjacent to" each other may be in physical contact with each other, in close proximity to each other, or in the same general region or area as each other, as appropriate for the context in which the phrase is used.

Numerical amounts and data may be expressed or presented herein in a range format. It is to be understood, that such a range format is used merely for convenience and brevity, and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Various techniques, or certain aspects or portions thereof, may take the form of program code (i.e., instructions) embodied in tangible media, such as floppy diskettes, compact disc-read-only memory (CD-ROMs), hard drives, transitory or non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "processor" can include general purpose processors, specialized processors such as central processing units (CPUs), graphics processing units (GPUs), digital signal processors (DSPs), microcontrollers (MCUs), embedded controller (ECs), field programmable gate arrays (FPGAs), or other types of specialized processors, as well as base band processors used in transceivers to send, receive, and process wireless communications.

It should be understood that many of the functional units described in this specification may have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Aspects of the present technology are directed toward selective fetch panel self-refresh techniques. One or more display engines of a computing device can be configured to receive, or fetch rendered display frames. The display engine can also receive an indication of dirty regions of the new frames or determine the dirty regions in the new frames. The dirty regions are one or more portions of a new frame of image data that have changed relative to one or more previous frames. A display buffer can be filled by the display engine with just the dirty regions of the new frames. The display engine can then scan out the dirty region of the frames from the display buffer to one or more displays. The display engine can also be configured to, at times, fill the display buffer with one or more complete frames and scan the complete frames out of the display buffer for presentation on the one or more displays. Selective fill and scan out of dirty portions of the frame by the display engine reduces display buffer usage, reduces read and write bandwidth utilization, and shortens the run time of the display engine. The techniques for selective filling and scanning out dirty portions of frames can be combined with compression of the frame data, with adaptive contrast and backlight enhancement, and other techniques for reducing display buffer usage, reducing read and write bandwidth utilization, and shorten run time of the display engine.

Figure 1:
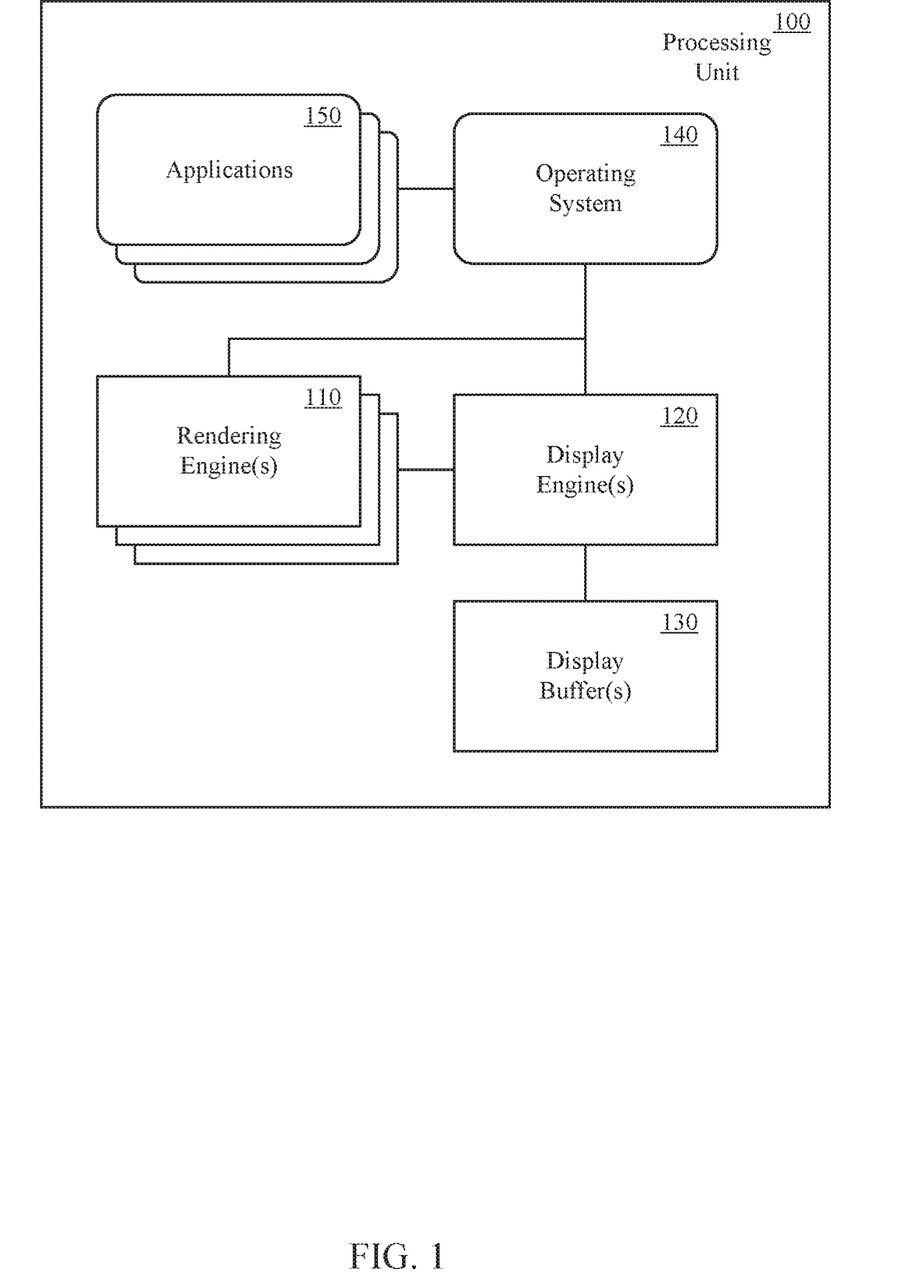
FIG. 1 is a block diagram illustrating a processing unit in accordance with an example.

FIG. 1 illustrates a processing unit in accordance with an example embodiment. The processing unit can be a Central Processing Unit (CPU), Graphics Processing Unit (GPU), or other similar processing unit. In some aspects, the processing unit 100 can include one or more rendering engines 110, one or more display engines 120, one or more display buffers 130 and a number of other functional modules. The other functional modules of the processing unit 100 are not necessary for an understanding of aspects of the present technology, and therefore will not be described further herein, as they will be readily recognized by those of ordinary skill in the relevant art. The processing unit 100 can be configured to execute computing device executable instructions stored in one or more computing device readable media to implement an Operating System (OS) 140 and one or more other applications 150. The one or more other applications 150 are not necessary for an understanding of aspects of the present technology, and therefore will not be described further herein. The OS 140 can be configured to control the execution of the one or more other applications 150, and control the functions performed by the one or more rendering engines 110, the one or more display engines 120 and the one or more display buffers 130.

In some aspects, the display engine 120 can be configured to receive an indication of a new frame from a rendering engine 110, or the OS 140. The display engine 120 can be further configured to determine one or more dirty regions of the new frame. In one implementation, determining one or more dirty regions can include receiving an indication of the one or more dirty regions from a rendering engine 110 or the OS 140. In another implementation, the display engine 120 can produce a flip of multiple planes of the new frame. The display engine 120 can then determine which of the multiple planes include one or more dirty regions based on which plane has flipped or not flipped. In yet another implementation, the display engine 120 can determine if the indication of a new frame includes an indication of a flip event. The display engine 120 can then determine one or more dirty regions of the new frame based on the flip event.

In aspects, the display engine 120 can be further configured to fill the display buffer 130 with the one or more dirty regions of the new frame. The display engine 120 can also be further configured to scan out the one or more dirty regions of the new frame from the display buffer 130 to a display port. In contrast, typical display engines receive new frames, fill the display buffer with the entire new frame, and scan the entire new frame out from the display buffer to the display. In accordance with a Panel Self-Refresh (PSR)

implementation, the display engine can be configured to fill the display buffer and scan out the new frame to the display when the new frame includes an update, rather than cycling through the fill and scan-out process for all frames. PSR advantageously reduces bandwidth utilization by filling and scanning out only when the new frame includes an update. In a PSR2 implementation, the display engine can be configured to detect frame updates, and to scan out the dirty regions of the new frame, rather than the complete frame. Therefore, PSR2 achieves further reductions in bandwidth utilization by scanning out just the portions of a new frame that include an update. Some aspects of the present technology achieve reductions in bandwidth utilization, and therefore reduced power consumption, by filling the display buffer and scanning out from the display buffer just the portions of the new frame that include an update. In addition, aspects of the present technology reduce power consumption by reducing memory usage because just the portions of the new frame that include updates are stored in the display buffer. In addition, runtime is reduced because less of the new frame is processed by the display engine.

In some aspects, the new frame, the one or more dirty regions of the new frame in the display buffer 130, and/or the one or more dirty regions of the new frame scanned out from the display buffer 130 can be compressed. In one implementation, end-to-end compression of the frame data can also reduce the bandwidth utilization on the communication interface and therefore also reduce power consumption. In another implementation, the new frame and/or the one or more dirty regions of the new frame can be compressed upon scanning out from the frame buffer. The data compression in combination with selective fill and scan-out advantageously achieves further enhanced power savings. Even if there is a small percentage of the screen that changes, the compression provides additional power saving on top of the selective fill and scan-out feature of embodiments of the present technology.

In various aspects, the display engine 120 can be configured to fill the display buffer 130 with the full frame when the new frame does not include one or more dirty regions. In addition, the display engine 120 can be configured to fill the display buffer 130 with the full frame, even if it includes one or more dirty regions, when the new frame is received after a predetermine timeout period has expired. In another instance, the display engine 120 can be configured to fill the display buffer 130 with the full new frame, even if it includes one or more dirty regions, when the new frame is received after a predetermined number of other new frames.

In certain aspects, the display engine 120 can be configured to determine if an adaptive contrast and backlight enhancement can be enabled when the indication of the new frame is received after the timeout period has expired. Alternatively, the display engine can determine if the adaptive contrast and backlight enhancement can be enabled when the indication of the new frame is received after the predetermined number of frames. Adaptive contrast and backlight enhancement can enable control of the backlighting of a display to reduce the brightness of the screen and therefore reduce power consumption. Adaptive contrast and backlight enhancement may operate on regions of the frame that are larger than the partial updates of the one or more dirty regions. In such cases, adaptive contrast and backlight enhancements may be unable to calculate adjustments if used together with storing and scanning out one or more dirty regions instead of the new frame.or activated when the indication of the new frame is received after the predetermined number of frames. In such cases, the adaptive contrast and backlight enhancement can be set when it is determined that the adaptive contrast and backlight enhancement can be enabled/activated. /activateThe display engine 120 can analyze the frame and use a set of algorithms or logic to change the luma value of pixels while reducing the brightness of the backlight so that the illumination perceived by a user is substantially the same. When a current frame output on the display and a new frame are substantially different, new luma values for pixels and brightness for the backlight can be calculated. The display engine 120 can be further configured to disable the adaptive contrast and backlight enhancement if a gamma curve is in a linear mode when a flip completion event (e.g. presentation completion event) indication is determined. The adaptive contrast and backlight enhancement can also be disabled if the gamma curve is in the linear mode before a timeout period expires. The adaptive contrast and backlight enhancement can also be disabled if the gamma curve is in the linear mode when a count of new frames is less than a specified frame count. Therefore, aspects of the present technology can advantageously keep adaptive contrast and backlight enhancement enabled to maintain the power saving from adaptive contrast and backlight enhancement.

Figure 2:
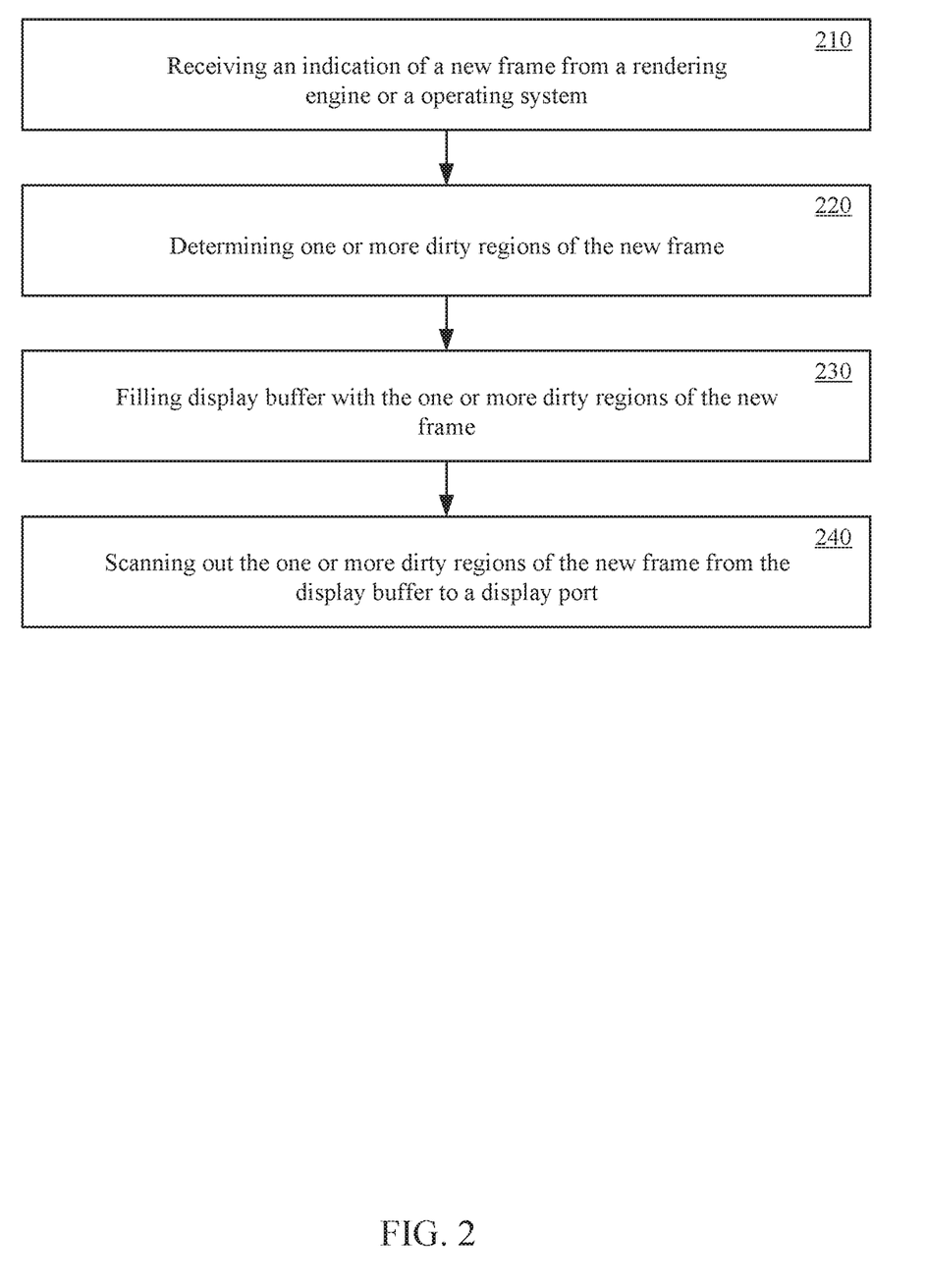
FIG. 2 is a flow diagram illustrating a method of buffering display frames in accordance with an example.

FIG. 2 illustrates a method of buffering display frames in accordance with an example. In some aspects, an indication of a new frame can be received or fetched from a rendering engine or an operating system 210. One or more dirty regions of the new frame can be determined 220. In one implementation, determining one or more dirty regions of the new frame can include receiving an indication of the one or more dirty regions from the rendering engine or the operating system. For example, the operating system can keep track of dirty primitives (e.g., rectangles or triangles) in a new frame that have changed or been updated with respect to the previous frame. The operating system can provide an indication of the number of dirty primitives along with the coordinates of the dirty primitives when the operating system provides the indication of the new frame. In another implementation, the new frame indication can include an indication of a flip event. The dirty regions can, in such case, be determined based on the flip event. In another implementation, determining the dirty regions can include producing a flip of multiple planes of the new frame. Which of the multiple planes include one or more dirty regions can then determined based on which plane has flipped or not flipped.

In various aspects, a display buffer can be filled with the one or more dirty regions of the new frame 230. The one or more dirty regions of the new frame can be scanned out from the display buffer to a display port 240. The process of filling the display buffer with just or only the dirty regions and scanning out the dirty regions from the display buffer to the display port can be time sensitive. Therefore, fill and scan-out operations can be performed within a specified time limit to avoid the occurrence of visual artifacts on the display.

In some aspects, the data of the new frame and the one or more dirty regions of the new frame can be encoded in a compressed format for filling and scanning out from the display buffer.

In various aspects, an adaptive contrast and backlight enhancement can be disabled if a gamma curve is in a linear mode when a flip completion event indication is determined. In one implementation, when the gamma curve is in the linear mode no correction is applied and therefore adaptive contrast and backlight enhancement can be disabled for partial frame updates. The adaptive contrast and backlight enhancement can also be disabled if the gamma curve is in the linear mode before a timeout period has expired. After the timeout period has expired, a next new frame can be checked to determine if the content has changed to possibly update the adaptive contrast and backlight enhancement. The adaptive contrast and backlight enhancement can also be disabled if the gamma curve is in the linear mode when the new frame is received within a predetermined number of frames. After a predetermined number of frames have been received, a next new frame can be checked to determine if the content has changed to possibly update the adaptive contrast and backlight enhancement. Periodically checking frames after a timeout or a predetermined number of frames can be used to create a histogram. In addition, the timeout period or number of frames can be dynamically adjusted based on scene brightness and/or the amount of the screen that has updated. Therefore, aspects of the present technology can advantageously keep the adaptive contrast and backlight enhancement enabled to maintain the power saving from the adaptive contrast and backlight enhancement. In addition, the selective fetch can be adaptively enabled based on the brightness data of the histogram. For a first selective update, the histogram can be analyzed to determine the brightness of the scene. When the scene is far from being triggered to apply the adaptive contrast and backlight enhancement, a high number of selective updates can be done. The operating system or display engine can track how much of the screen has changed to determine when the screen might be close to being less bright. Once there is less certainty about how bright the scene might be, then a full frame update can be triggered. For instance, when a user is typing, just a small percentage (e.g., 1%) of the screen is changing. A series of 1% of the screen changes may not be meaningful enough to change the brightness if the user is typing for 10 minutes. In such circumstances, the adaptive contrast and backlight enhancement may not be checked for a long period of time. In some implementations, the histogram can be region based for a frame and then combined to create a frame-based histogram. The partial updates, in such cases, can be done on a region basis that aligns with region-based histogram boundaries. In such cases, the adaptive contrast and backlight enhancement and selective updates can then coexist even while the adaptive contrast and backlight enhancement is applied.

Figure 3:
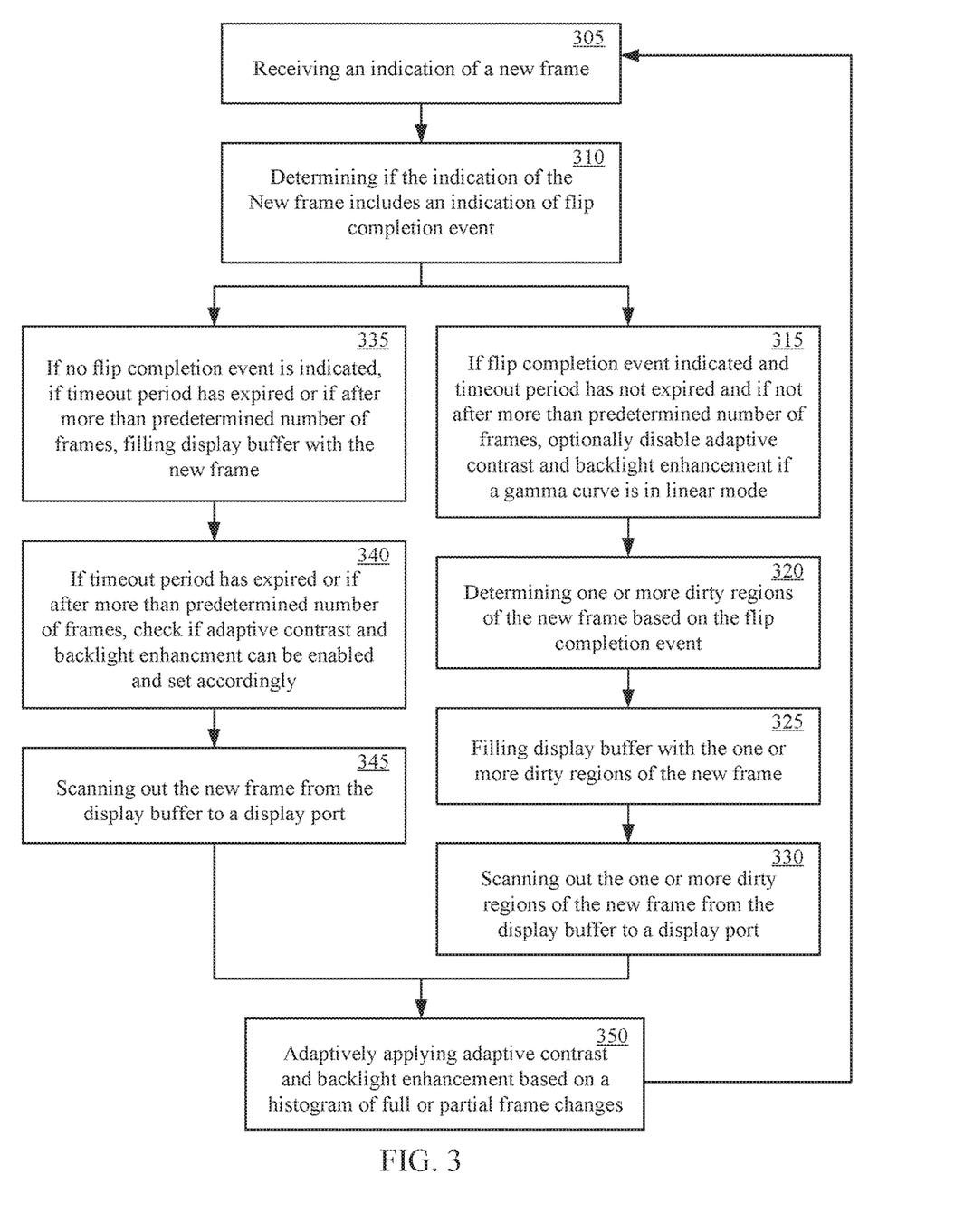
FIG. 3 is a flow diagram illustrating a method of buffering display frames in accordance with an example.

FIG. 3 illustrates a method of buffering display frames in accordance with an example. In some aspects, an indication of a new frame can be received 305. In one implementation, the indication of the new frame can be received from a rendering engine. In another implementation, the indication of the new frame can be received from an operating system. A determination can be made as to whether the new frame includes an indication of a flip completion event 310.

In certain aspects, if a flip completion event is indicated an optional adaptive contrast and backlight enhancement can be disabled 315. For example, if a flip completion event is indicated and a timeout period has not expired, the adaptive contrast and backlight enhancement can be disabled if the gamma curve is in a linear mode. Similarly, the adaptive contrast and backlight enhancement can be disabled if the gamma curve is in a linear mode, if a flip completion event is indicated and the new frame is received within a predetermined number of frames.

In other aspects, if a flip completion event is indicated, one or more dirty regions of the new frame can be determined based on the flip completion event 320. A display buffer can be filled with just the one or more dirty regions of the new frame 325. The one or more dirty regions of the new frame can then be scanned out from the display buffer to a display port 330.

In various aspects, if a flip completion event was not indicated, the display buffer can be filled with the new frame 335. Optionally, the display buffer can also be filled with the new frame if the timeout period has expired before the indication of the new frame is received. Optionally, the display buffer can also be filled with the new frame if the new frame is received after a predetermined number of other frames.

In some aspects, if a flip completion event was not indicated, an optional adaptive contrast and backlight enhancement can be enabled 340. For example, if the timeout period has expired or if the new frame is received after a predetermined number of other frames, a check can be performed to determine if the adaptive contrast and backlight enhancement can be enabled and the adaptive contrast and backlight enhancement can be set accordingly. If a flip completion event was not indicated, the new frame can be scanned out from the display buffer to the display port 345.

In one aspect, the optional adaptive contrast and backlight enhancement can be adaptively applied based on a histogram of the full or partial frame changes 350. For a first selective update, the histogram can be analyzed to determine the brightness of the scene. When the scene is far from being triggered to apply adaptive contrast and backlight enhancement, many selective updates can be done. The operating system or display engine can track how much of the screen has changed to determine when the screen might be close to being less bright. Once there is less certainty about how bright the scene might be, then a full frame update can be triggered. For instance, when a user is typing, just a small percentage (e.g., 1%) of the screen is changing. A series of 1% of the screen changes may not be meaningful enough to change the brightness if the user is typing for 10 or 15 minutes. In such circumstances, the adaptive contrast and backlight enhancement may not be checked for a long period of time. In some implementations, the histogram can be region based for a frame and then combined to create a frame-based histogram. The partial updates, in such cases, can be done on a region basis that align with region-based histogram boundaries. In such cases, the adaptive contrast and backlight enhancement and selective updates can then coexist even while the adaptive contrast and backlight enhancement is applied.

Figure 4:
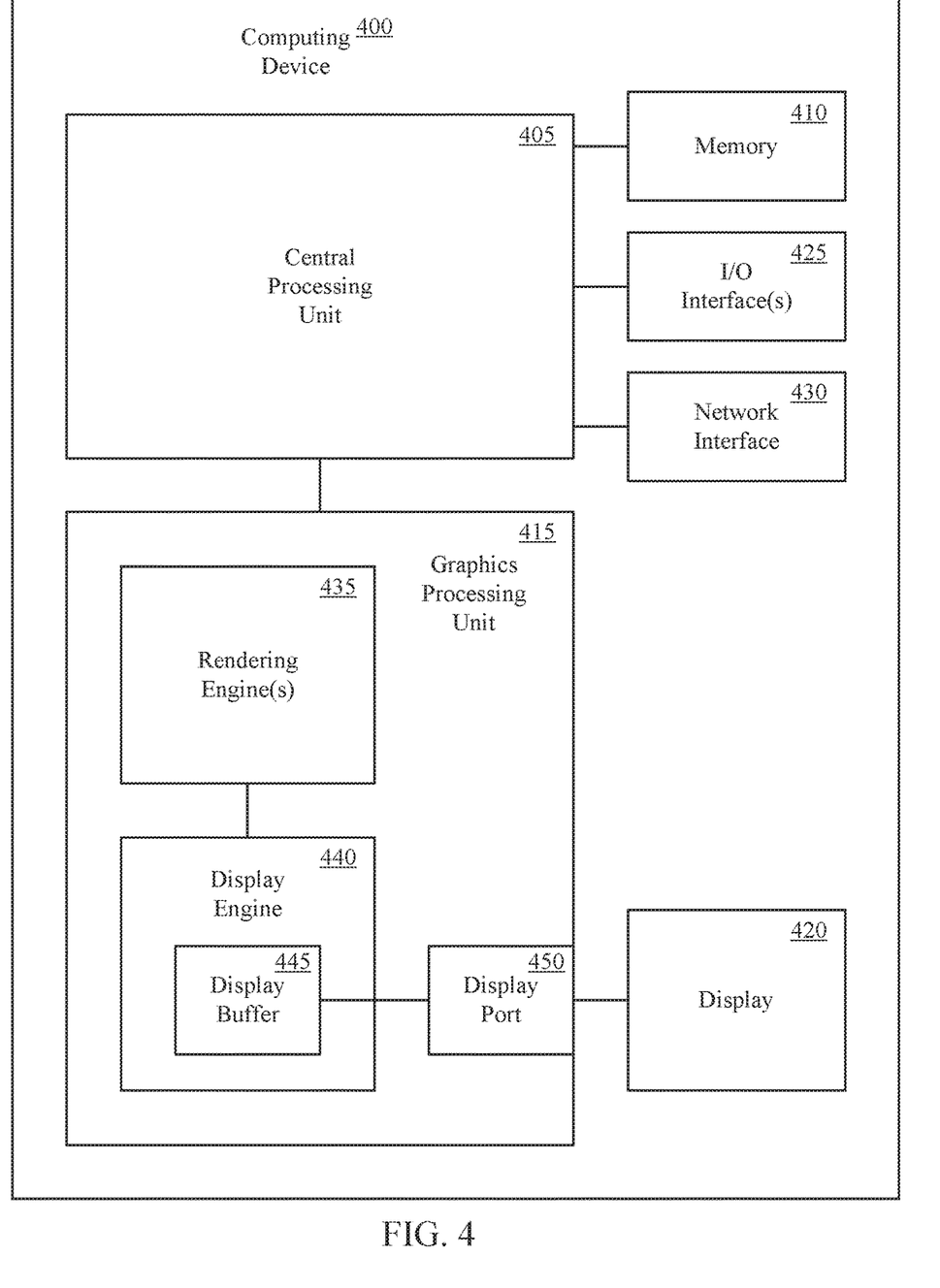
FIG. 4 is a block diagram illustrating a computing device in accordance with an example.

FIG. 4 illustrates a computing device in accordance with an example. The computing device can, for example, be a cellular telephone, smart phone, e-reader, tablet personal computer (PC), laptop PC, desktop PC, gaming console, smart television, workstation, server, or other similar computing device. The computing device 400 can include one or more central processing units 405, one or more computing device readable media (e.g. computer memory) 410, one or more graphics processing units (GPUs) 415, and one or more displays 420. The computing device 400 can also include numerous other components such as one or more additional input/output (I/O) interfaces 425, one or more network interfaces 430, and the like. Additional components are not necessary to an understanding of aspects of the present technology and therefore will not be further described herein.

In aspects, the graphics processing unit 415 can include one or more rendering engines 435, one or more display engines 440, one or more display buffers 445, and one or more display ports 450. The graphics processing unit 415 can also include numerous other components. However, such other components are not necessary for an understanding of aspects of the present technology, and therefore are not described further herein.

In one implementation, an Operating System (OS) stored in memory 410 that when executed by the central processing unit 405 can be configured to off-load rendering of display scene data to the one or more rendering engines 435. The OS can manage the rendering of display frames by the one or more rendering engines 435 and the presentation of the frames by the one or more display engines 440 to the one or more displays 420 for output to a user. The OS can, for example, provide an indication to the one or more display engines 440 when new frames are available from the one or more rendering engines 435.

As described above in more detail with respect to FIGS. 1-3, the one or more display engines 440 can be configured to fetch rendered display frames from the one or more rendering engines 435. The one or more display engines 440 can also be configured to receive an indication of dirty regions of the new frames or determine the dirty regions in the new frames. The display buffer 445 can be configured to be filled by the display engine 440 with just the dirty regions of the new frames. The display engine 440 can also be configured scan out the dirty region of the frames from the display buffer 445 to the display port 450 for output to one or more displays 420. The display engine 440 can also be configured to fill the display buffer 445 with one or more complete frames and scan the complete frames out of the display buffer 445 to the display port 450. For example, after a predetermined number of frames, the display engine 440 can fill the display buffer 445 with a complete frame and scan the complete frame out to the display port 450.

In one implementation, the display port 450 can be an Embedded Display Port (eDP) or can be a wireless display interface port. In the case of a wireless display interface port, there may be a single display buffer between an encoder and the display. The display can have no update, but the encoder may need to improve quality at times. While the display capture may just need to update a small part, the encoder can still use the entire frame. With a single frame buffer, the display will write just the changed pixels. Then the encoder will still have access to the full frame as needed to encode the dirty regions.

Figure 5:
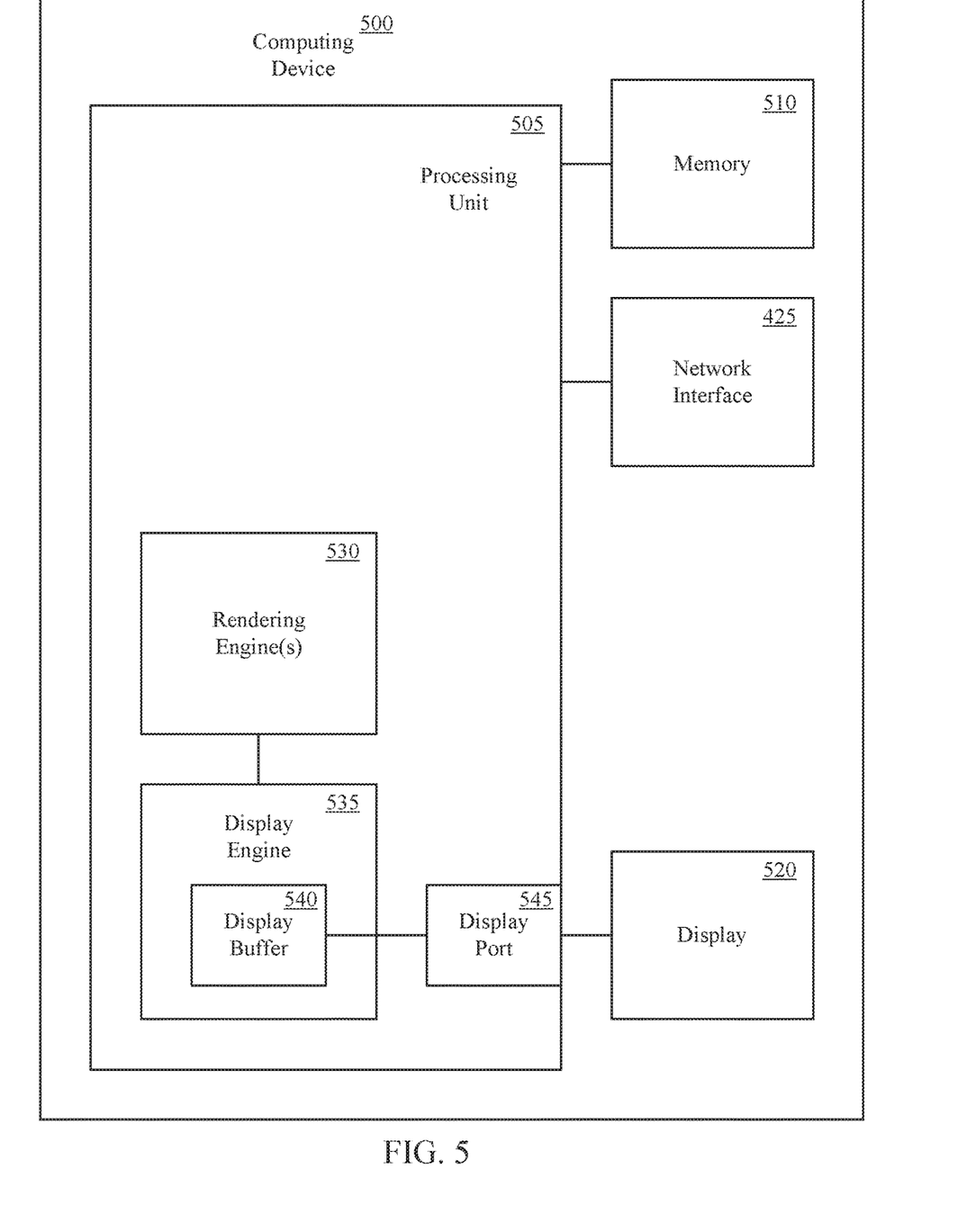
FIG. 5 is a block diagram illustrating a computing device in accordance with an example.

FIG. 5 illustrates a computing device in accordance with an example. The computing device can, for example, be a cellular telephone, smart phone, e-reader, tablet personal computer (PC), laptop PC, desktop PC, gaming console, smart television, workstation, server, or other similar computing device. The computing device 500 can include one or more central processing units 505, one or more computing device readable media (commonly referred to as computer memory) 510, and one or more displays 520. The computing device 500 can also include numerous other components such as one or more additional input/output (I/O) interfaces, one or more network interfaces 525, and the like. The additional components are not necessary to an understanding of aspects of the present technology and therefore will not be further described herein.

The processing unit 505 can include one or more rendering engines 530, one or more display engines 535, one or more display buffers 540, and one or more display ports 545. The processing unit 505 can also include numerous other components. However, such other components are not necessary for an understanding of aspects of the present technology, and therefore are not described further herein.

As described above in more detail with respect to FIGS. 1-3, the one or more display engines 535 can be configured to fetch display frames from the one or more rendering engines 530. The one or more display engines 535 can also be configured to receive an indication of dirty regions of the new frames or determine the dirty regions in the new frames. The display buffer 540 can be configured to be filled by the display engine 535 with just the dirty regions of the new frames. The display engine 535 can also be configured scan out the dirty region of the frames from the display buffer 540 to the display port 545 for output to one or more displays 520. After a predetermined number of new frames or a predetermined timeout period, the display engine 535 can be configured fill the display buffer 540 with one or more complete frames and scan the complete frames out of the display buffer 545 to the display port 545.

The computing devices illustrated in FIGS. 4 and 5 are illustrative of exemplary embodiments and are not intended to limit aspects of the present technology. Various components of the computing devices can be arranged in various other combinations. For example, the display can be internal (e.g., smart phone or tablet) or external (e.g., desktop PC or smart TV) to the computing device. In another example, the rendering engine and display engine can be separate components or integrated together. In yet another example, the display buffer can be integral to the display engine, a separate component from the display engine, implemented in the memory coupled to the processing unit, or the like.

Aspects of the present technology advantageously reduce the read and write bandwidth because the display engine reads and writes just dirty region of a new frame. In addition, memory usage can be advantageously decreased because just the dirty regions are stored in the frame buffer. The bandwidth reductions and memory usage reductions can be further extended by use of data compression. In addition, read and writing just dirty regions can advantageously reduce the runtime of the display engine.

EXAMPLES

The following examples pertain to specific technology embodiments and point out specific features, elements, or steps that may be used or otherwise combined in achieving such embodiments.

Example 1 includes a processing unit comprising: a display buffer; and a display engine configured to; receive an indication of a new frame from a rendering engine or an operating system; determine one or more dirty regions of the new frame; fill the display buffer with the one or more dirty regions of the new frame; and scan out the one or more dirty regions of the new frame from the display buffer to a display port.

Example 2 includes the processing unit of Example 1, wherein the display engine is configured to receive an indication of the one or more dirty regions.

Example 3 includes the processing unit of Example 1, wherein the display engine is configured to: produce a flip of multiple planes; and determine which of the multiple planes includes one or more dirty regions based on which plane has flipped or not flipped.

Example 4 includes the processing unit of Example 1, wherein the new frame, the one or more dirty regions of the new frame in the display buffer, and the one or more dirty regions of the new frame scanned out are compressed.

Example 5 includes a processing unit comprising: a display buffer; and a display engine configured to; receive an indication of a new frame from a rendering engine or an operating system; determine if the indication of a new frame includes an indication of a flip event; determine one or more dirty regions of the new frame based on the flip event; fill the display buffer with the one or more dirty regions of the new frame; and scan out the one or more dirty regions of the new frame from the display buffer to a display port.

Example 6 includes the processing unit of Example 5, wherein the display engine is further configured to disable an adaptive contrast and backlight enhancement if a gamma curve is in a linear mode when a flip completion event indication is determined.

Example 7 includes the processing unit of Example 6, wherein the adaptive contrast and backlight enhancement is further disabled if the gamma curve is in the linear mode before a timeout period has expired.

Example 8 includes the processing unit of Example 6, wherein the adaptive contrast and backlight enhancement is further disabled if the gamma curve is in the linear mode when not after a predetermined number of frames.

Example 9 includes the processing unit of Example wherein the display engine is further configured to; fill the display buffer with the new frame when the flip completion event indication is not determined; and scan out the new frame from the display buffer to display port.

Example 10 includes the processing unit of Example 9, wherein the display engine is further configured to; fill the display buffer with the new frame further when the indication of the new frame is received a timeout period has expired.

Example 11 includes the processing unit of Example claim 9, wherein the display engine is further configured to; fill the display buffer with the new frame further when the indication of the new frame is received after a predetermined number of frames.

Example 12 includes the processing unit of Example 9, wherein the display engine is further configured to; determine if the adaptive contrast and backlight enhancement can be enabled when the indication of the new frame is received after a timeout period has expired; and set the adaptive contrast and backlight enhancement when it is determined that the adaptive contrast and backlight enhancement can be enabled.

Example 13 includes the processing unit of Example 9, wherein the display engine is further configured to; determine if the adaptive contrast and backlight enhancement can be enabled when the indication of the new frame is received after a predetermined number of frames; and set the adaptive contrast and backlight enhancement when it is determined that the adaptive contrast and backlight enhancement can be enabled.

Example 14 includes the processing unit of Example 5, wherein the processing unit comprises a graphics processing unit.

Example 15 includes the processing unit of Example 5, wherein the processing unit comprises a central processing unit.

Example 16 includes a method of buffering rendered display frames for presenting on a display comprising: receiving an indication of a new frame from a rendering engine or an operating system; determining one or more dirty regions of the new frame; filling a display buffer with the one or more dirty regions of the new frame; and scanning out the one or more dirty regions of the new frame from the display buffer to a display port.

Example 17 includes the method of Example 16, wherein determining one or more dirty regions of the new frame includes receiving an indication of the one or more dirty regions.

Example 18 includes the method of Example 16, wherein determining one or more dirty regions of the new compressed frame includes: producing a flip of multiple planes; and determining which of the multiple planes includes one or more dirty regions based on which plane has flipped or not flipped.

Example 19 includes the method of Example 16, wherein the new frame, the one or more dirty regions of the new frame in the display buffer, and the one or more dirty regions of the new frame scanned out are compressed.

Example 20 includes a method of buffering rendered display frames for presenting on a display comprising: receiving an indication of a new frame from a rendering engine or an operating system; determining if the indication of a new frame includes an indication of a flip event; determining one or more dirty regions of the new frame based on the flip event; filling the display buffer with the one or more dirty regions of the new frame; and scanning out the one or more dirty regions of the new frame from the display buffer to a display port.

Example 21 includes the method of Example 20, further comprising: disabling an adaptive contrast and backlight enhancement if a gamma curve is in a linear mode when a flip completion event indication is determined.

Example 22 includes the method of Example 21, wherein the adaptive contrast and backlight enhancement is further disabled if the gamma curve is in the linear mode before a timeout period has expired.

Example 23 includes the method of Example 21, wherein the adaptive contrast and backlight enhancement is further disabled if the gamma curve is in the linear mode when is received within a predetermined number of frames.

Example 24 includes the method of Example 20, further comprising: filling the display buffer with the new frame when the flip completion event indication is not determined; and scanning out the new frame from the display buffer to display port.

Example 25 includes the method of Example 24, further comprising: filling the display buffer with the new frame further when the indication of the new frame is received after a timeout period has expired.

Example 26 includes the method of Example 24, further comprising: filling the display buffer with the new frame further when the indication of the new frame is received after a predetermined number of frames.

Example 27 includes the method of Example 24, further comprising: determining if the adaptive contrast and backlight enhancement can be enabled when the indication of the new frame is received after a timeout period has expired; and setting the adaptive contrast and backlight enhancement when it is determined that the adaptive contrast and backlight enhancement can be enabled.

Example 28 includes the method of Example 24, further comprising: determining if the adaptive contrast and backlight enhancement can be enabled when the indication of the new frame is received after a predetermined number of frames; and setting the adaptive contrast and backlight enhancement when it is determined that the adaptive contrast and backlight enhancement can be enabled.

Example 29 includes the method of Example 20, further comprising: applying the adaptive contrast and backlight enhancement based on a histogram of full frame changes.

Example 30 includes the method of Example 20, further comprising: applying the adaptive contrast and backlight enhancement based on a histogram of partial frame changes.

Example 31 includes a computing device comprising: a display; and a processing unit including a display buffer and a display engine, the display engine configured to; receive an indication of a new frame from a rendering engine or an operating system; determine one or more dirty regions of the new frame; fill the display buffer with the one or more dirty regions of the new frame; and scan out the one or more dirty regions of the new frame from the display buffer to a display port.

Example 32 includes the computing device of Example 31, wherein the display engine is configured to receive an indication of the one or more dirty regions.

Example 33 includes the computing device of Example 31, wherein the display engine is configured to: produce a flip of multiple planes; and determine which of the multiple planes includes one or more dirty regions based on which plane has flipped or not flipped.

Example 34 includes the computing device of Example 31, wherein the new frame, the one or more dirty region of the new frame in the display buffer, and the one or more dirty regions of the new frame scanned out are compressed.

Example 35 includes the computing device of Example 31, wherein the processing unit comprises a central processing unit.

Example 36 includes the computing device of Example 31, wherein the processing unit comprises a graphics processing unit.

Example 37 includes the computing device of Example 31, wherein the display engine is coupled to the display by the display port.

Example 38 includes a computing device comprising: a display; and a processing unit including a display buffer and a display engine, the display engine configured to; receive an indication of a new frame from a rendering engine or an operating system; determine if the indication of a new frame includes an indication of a flip event; determine one or more dirty regions of the new frame based on the flip event; fill the display buffer with the one or more dirty regions of the new frame; and scan out the one or more dirty regions of the new frame from the display buffer to a display port.

Example 39 includes the computing device of Example 38, wherein the display engine is further configured to disable an adaptive contrast and backlight enhancement if a gamma curve is in a linear mode when a flip completion event indication is determined.

Example 40 includes the computing device of Example 39, wherein the adaptive contrast and backlight enhancement is further disabled if the gamma curve is in the linear mode when a timeout period has not expired.

Example 41 includes the computing device of Example 39, wherein the adaptive contrast and backlight enhancement is further disabled if the gamma curve is in the linear mode when not after a predetermined number of frames.

Example 42 includes the computing device of Example 38, wherein the display engine is further configured to; fill the display buffer with the new frame when the flip completion event indication is not determined; and scan out the new frame from the display buffer to display port.

Example 43 includes the computing device of Example 42, wherein the display engine is further configured to; fill the display buffer with the new frame further when the indication of the new frame is received a timeout period has expired.

Example 44 includes the computing device of Example 42, wherein the display engine is further configured to; fill the display buffer with the new frame further when the indication of the new frame is received after a predetermined number of frames.

Example 45 includes the computing device of Example 42, wherein the display engine is further configured to; determine if the adaptive contrast and backlight enhancement can be enabled when the indication of the new frame is received after a timeout period has expired; and set the adaptive contrast and backlight enhancement when it is determined that the adaptive contrast and backlight enhancement can be enabled.

Example 46 includes the computing device of Example 42, wherein the display engine is further configured to; determine if the adaptive contrast and backlight enhancement can be enabled when the indication of the new frame is received after a predetermined number of frames; and set the adaptive contrast and backlight enhancement when it is determined that the adaptive contrast and backlight enhancement can be enabled.

Example 47 includes the computing device of Example 38, wherein the display engine is further configured to apply the adaptive contrast and backlight enhancement based on a histogram of full frame changes.

Example 49 includes the computing device of Example 38, wherein the display engine is further configured to apply the adaptive contrast and backlight enhancement based on a histogram of partial frame changes.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

What is claimed is:

1. A processing unit comprising:
a display buffer; and
a display engine to:
receive an indication of a new frame;
determine if the indication of a new frame includes an indication of a flip event;
identify one or more dirty regions of the new frame based on the flip event;
fill the display buffer with the one or more dirty regions of the new frame;
scan out the one or more dirty regions of the new frame from the display buffer to a display port; and
apply an adaptive contrast and backlight enhancement based on a histogram of changes in the new frame.

2. The processing unit of claim 1, wherein the display engine is to disable the adaptive contrast and backlight enhancement when a flip completion event indication is determined and a timeout period has not expired.

3. The processing unit of claim 1, wherein the display engine is to disable the adaptive contrast and backlight enhancement if a gamma curve is in a linear mode when a flip completion event indication is determined.

4. The processing unit of claim 3, wherein the adaptive contrast and backlight enhancement is disabled if the gamma curve is in the linear mode before a timeout period has expired.

5. The processing unit of claim 3, wherein the adaptive contrast and backlight enhancement is disabled if the gamma curve is in the linear mode prior to a predetermined number of frames.

6. The processing unit of any one of claim 1, wherein the display engine is further to:
fill the display buffer with the new frame when a flip completion event indication is not determined; and
scan out the new frame from the display buffer to display port.

7. The processing unit of claim 6, wherein the display engine is to:
fill the display buffer with the new frame when the indication of the new frame is received after a timeout period has expired.

8. The processing unit of claim 6, wherein the display engine is to:
fill the display buffer with the new frame when the indication of the new frame is received after a predetermined number of frames.

9. A computing device comprising:
a display;
a display buffer; and
a display engine to:
receive an indication of a new frame;
identify one or more dirty regions of the new frame;
fill the display buffer with the one or more dirty regions of the new frame;
scan out the one or more dirty regions of the new frame from the display buffer to a display port; and
apply an adaptive contrast and backlight enhancement based on a histogram of changes in the new frame.

10. The computing device of claim 9, wherein the display engine is to receive an indication of the one or more dirty regions.

11. The computing device of claim 9, wherein the display engine is to:
produce a flip of multiple planes; and
determine which of the multiple planes includes one or more dirty regions based on which plane has flipped or not flipped.

12. The computing device of claim 9, wherein the new frame, the one or more dirty regions of the new frame in the display buffer, and the one or more dirty regions of the new frame scanned out are compressed.

13. The computing device of claim 9, wherein the display engine is to receive an indication of a new frame from at least one of a rendering engine or an operating system.

14. The computing device of claim 9, wherein the display engine is to disable the adaptive contrast and backlight enhancement when a flip completion event indication is determined and a timeout period has not expired.

15. The computing device of claim 9, wherein the display engine is to disable the adaptive contrast and backlight enhancement if a gamma curve is in a linear mode when a flip completion event indication is determined.

16. The computing device of claim 15, wherein the adaptive contrast and backlight enhancement is disabled if the gamma curve is in the linear mode when a timeout period has not expired.

17. The computing device of claim 15, wherein the adaptive contrast and backlight enhancement is disabled if the gamma curve is in the linear mode prior to a predetermined number of frames.

18. The computing device of claim 9, wherein the display engine is to:
fill the display buffer with the new frame when no dirty regions have been identified; and
scan out the new frame from the display buffer to display port.

19. The computing device of claim 18, wherein the display engine is further to:
fill the display buffer with the new frame further when the indication of the new frame is received after a timeout period has expired.

20. The computing device of claim 18, wherein the display engine is further to:
fill the display buffer with the new frame further when the indication of the new frame is received after a predetermined number of frames.

21. A method of buffering rendered display frames for presenting on a display, the method comprising:
receiving, at a display engine, an indication of a new frame;
determining, with the display engine, if the indication of a new frame includes an indication of a flip event;
determining, with the display engine, one or more dirty regions of the new frame based on the flip event;
filling a display buffer with the one or more dirty regions of the new frame; and
scanning out the one or more dirty regions of the new frame from the display buffer to a display port; and
applying an adaptive contrast and backlight enhancement based on a histogram of changes in the new frame.

22. The method of claim 21, further including:
disabling the adaptive contrast and backlight enhancement when a flip completion event indication is determined and a timeout period has not expired.

23. The method of claim 21, further including:
disabling the adaptive contrast and backlight enhancement if a gamma curve is in a linear mode when a flip completion event indication is determined.

24. The method of claim 23, wherein the adaptive contrast and backlight enhancement is further disabled if the gamma curve is in the linear mode before a timeout period has expired, or within a predetermined number of frames.

25. The method of claim 21, further including:
filling the display buffer with the new frame when a flip completion event indication is not determined; and
scanning out the new frame from the display buffer to display port.

26. The method according to claim 25, further including:
filling the display buffer with the new frame when the indication of the new frame is received after a timeout period has expired.

27. The method according to claim 25, further including:
filling the display buffer with the new frame when the indication of the new frame is received after a predetermined number of frames.

* * * * *